United States Patent
Schade et al.

(10) Patent No.: US 10,330,866 B2
(45) Date of Patent: Jun. 25, 2019

(54) OPTICAL COMPONENT AND METHOD FOR THE PRODUCTION THEREOF

(71) Applicants: Fraunhofer-Gesellschaft zur Förderung der angewandten Forschung e.V., Munich (DE); Baker Hughes Inteq GmbH, Celle (DE)

(72) Inventors: Wolfgang Schade, Goslar (DE);
Michael Köhring, Bad Sachsa (DE);
Christian Waltermann, Goslar (DE);
Konrad Bethmann, Hemmingen (DE);
Thomas Kruspe, Wietzendorf (DE);
Sebastian Jung, Isernhagen (DE);
Gunnar Tackmann, Hannover (DE)

(73) Assignees: FRAUNHOFER-GESELLSCHAFT ZUR FÖRDERUNG DER ANGEWANDTEN FORSCHUNG E.V., Munich (DE); BAKER HUGHES INTEQ GMBH, Celle (DE)

( * ) Notice: Subject to any disclaimer, the term of this patent is extended or adjusted under 35 U.S.C. 154(b) by 0 days.

(21) Appl. No.: 15/773,458

(22) PCT Filed: Nov. 14, 2016

(86) PCT No.: PCT/EP2016/077577
§ 371 (c)(1),
(2) Date: May 3, 2018

(87) PCT Pub. No.: WO2017/081316
PCT Pub. Date: May 18, 2017

(65) Prior Publication Data
US 2018/0329139 A1    Nov. 15, 2018

(30) Foreign Application Priority Data
Nov. 12, 2015   (DE) .......................... 10 2015 222 328

(51) Int. Cl.
*G02B 6/293* (2006.01)
*G02B 6/02* (2006.01)
(Continued)

(52) U.S. Cl.
CPC ....... *G02B 6/29334* (2013.01); *G02B 6/0026* (2013.01); *G02B 6/021* (2013.01);
(Continued)

(58) Field of Classification Search
CPC ............ G02B 6/29334; G02B 6/29332; G02B 6/124; G02B 6/021; G02B 6/12007; G02B 6/0026
See application file for complete search history.

(56) References Cited

U.S. PATENT DOCUMENTS 5,805,751 A    9/1998   Kewitsch et al.
5,808,751 A    9/1998   Hochman
(Continued)

FOREIGN PATENT DOCUMENTS

DE   10 2011 017 622 B3   10/2012
DE   10 2012 222 460 A1   6/2014
(Continued)

OTHER PUBLICATIONS

English translation of International Search Report, issued in International Application No. PCT/EP2016/077577, dated Jan. 30, 2017, pp. 1-3, European Patent Office, Rijswijk, The Netherlands.
(Continued)

*Primary Examiner* — Ryan A Lepisto
(74) *Attorney, Agent, or Firm* — Brinks Gilson & Lione

(57) ABSTRACT

An optical component comprising at least one first waveguide having a first core and a casing surrounding the first core, and comprising at least one second waveguide having a second core, wherein the first core and the second core are guided adjacent and at a distance to one another in a
(Continued)

longitudinal section, and at least one Bragg grating is arranged in said longitudinal section, and at least the first core, the first casing the second core and the Bragg grating are arranged in a single substrate.

27 Claims, 3 Drawing Sheets

(51) Int. Cl.
G02B 6/12 (2006.01)
G02B 6/124 (2006.01)
G02B 6/125 (2006.01)
F21V 8/00 (2006.01)

(52) U.S. Cl.
CPC ............. *G02B 6/124* (2013.01); *G02B 6/125* (2013.01); *G02B 6/12007* (2013.01); *G02B 6/29332* (2013.01)

(56) References Cited

U.S. PATENT DOCUMENTS

| | | | |
|---|---|---|---|
| 5,978,530 A | 11/1999 | Russell et al. | |
| 6,456,765 B1* | 9/2002 | Klocek | G02B 6/12004 385/42 |
| 6,567,573 B1 | 5/2003 | Domash et al. | |
| 6,999,659 B1* | 2/2006 | Nowak | G02B 6/14 385/28 |
| 7,609,918 B2* | 10/2009 | Narevicius | G02B 6/12007 385/28 |
| 9,702,738 B2 | 7/2017 | Schade | |
| 2003/0035640 A1 | 2/2003 | Dugan et al. | |
| 2009/0304331 A1 | 12/2009 | Herman et al. | |
| 2012/0039567 A1* | 2/2012 | Herman | G02B 6/124 385/37 |
| 2015/0309251 A1 | 10/2015 | Schade et al. | |

FOREIGN PATENT DOCUMENTS

WO WO 2011/154701 12/2001
WO WO 2014/154528 10/2014

OTHER PUBLICATIONS

L. Dong et al., "Novel Add/Drop Filters for Wavelenth-Division-Multiplexing Optical Fiber Systems Using a Bragg Grating Assisted Mismatched Coupler," IEEE Photonics Technology Letters, dated Dec. 1996, pp. 1656-1658, vol. 8, No. 12, published by IEEE, Piscaraway, US.

Robert J. Williams et al., "Point-by-point inscription of apodized fiber Bragg gratings," Optics Letters, dated Aug. 1, 2011, pp. 2988-2990, vol. 36, No. 15, published by Optical Society of America, Washington DC, US.

Jörg Burgmeier et al., "Point-by-point inscription of phase-shifted fiber Bragg gratings with electro-optic amplitude modulated femtosecond laser pulses," Optics Letters, dated Feb. 1, 2014, pp. 540-543, vol. 39, No. 3, published by Optical Society of America, Washington DC, US.

Christian Waltermann et al, "Cladding waveguide gratings in standard single-mode fiber for 3D shape sensing," Optics Letters, dated Jul. 1, 2015, pp. 3109-3112, vol. 40, No. 13, published by Optical Society of America, Washington DC, US.

* cited by examiner

OPTICAL COMPONENT AND METHOD FOR THE PRODUCTION THEREOF

CROSS-REFERENCE TO RELATED APPLICATIONS

This application is a 371 nationalization of international patent application PCT/EP2016/077577 filed Nov. 14, 2016, the entire contents of which are hereby incorporated by reference, which in turn claims priority under 35 USC § 119 to German patent application DE 10 2015 222 328.0 filed on Nov. 12, 2015.

DETAILED DESCRIPTION

Figure 1:
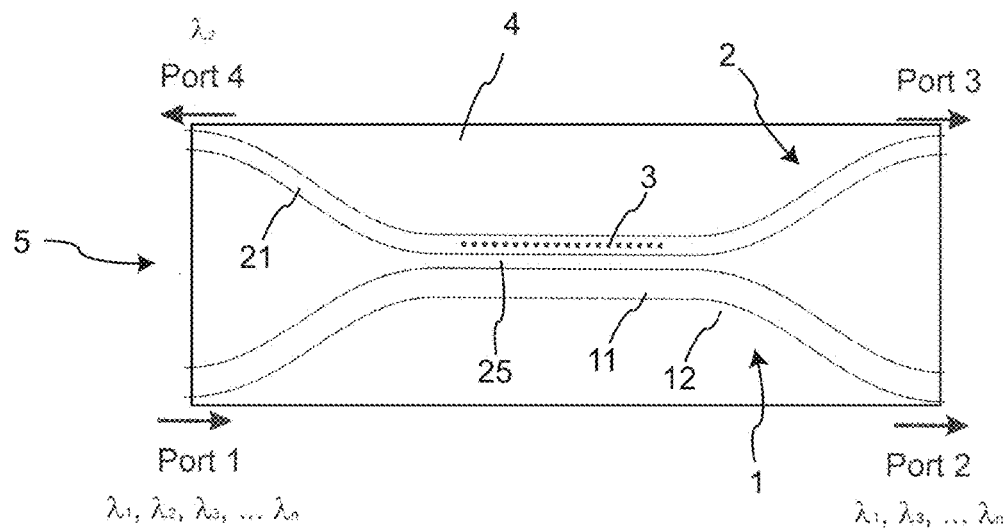
FIG. 1 an embodiment of an add-drop filter according to the present invention.

The invention relates to an optical component comprising at least one first waveguide having a first core and a casing surrounding the first core, and comprising at least one second waveguide having a second core, wherein the first core and the second core are guided side by side in a longitudinal section and at least one Bragg grating is arranged in this longitudinal section. The invention also relates to a method for producing an optical component of this type by point-to-point exposure of a substrate with a short-pulse laser. Components of the above mentioned type can be used e.g. as add-drop filter or spectrometer.

U.S. Pat. No. 5,978,530 discloses an above mentioned optical component. This known component contains two waveguides, each of which has a core and a casing surrounding the core. A fiber Bragg grating is disposed in the core of a waveguide and consists of a plurality of spatial regions with modified refractive index, each of which has a predeterminable distance from one another. This predeterminable distance defines the grating constant of the fiber Bragg grating. The two waveguides are each embedded in a glass block. A longitudinal side of the glass blocks is polished and at least part of the casing of the waveguide is removed. In a subsequent production step, the two glass blocks are joined in such a way that light can pass over from the core of the first waveguide into the core of the second waveguide by evanescent coupling. The fiber Bragg grating here acts as a filter element in such a way that, on the one hand, an optical signal is provided at the outlets of the optical component, said signal having a wavelength defined by the grating constant and, on the other hand, an optical signal is provided at another outlet, said signal no longer containing this wavelength.

This known optical component can be used as an add-drop filter in an optical WDM (wavelength division multiplex) system, i.e. a data transmission system, in which different data streams are transported on associated optical carrier signals having different wavelength. The grating constant of the fiber Bragg grating here defines the wavelength of a carrier signal which is removed from the input signal.

A drawback of this known optical component is the major effort which is involved in the production of the optical component. For example, the production requires precise mechanical processing and accurate positioning of the two waveguides with respect to each other to achieve the desired properties of the component. The required processing steps of polishing and positioning during the production increase the risk of producing rejects, as a result of which the known optical components have not yet been able to gain acceptance on a broad basis.

Proceeding from the prior art, the object of the invention is therefore to facilitate the production of the optical component and to expand the application possibilities.

The invention proposes an optical component which comprises at least one first waveguide having a first core and a casing surrounding the first core. The first core can have a round or polygonal cross-section. The casing can surround the core in the form of a material layer of constant thickness, such that core and casing are arranged e.g. coaxially with respect to one another. In other embodiments of the invention, the casing can have a larger expansion and e.g. form a planar substrate. Such a substrate can contain or consist of e.g. a polymer film, a glass, quartz or a semiconductor. The boundary surface between the core and the casing can be designed so as to be geometrically defined. In other embodiments of the invention, the material of the core can continuously merge into the material of the casing. Core and casing have different refractive indices, as a result of which a total reflection occurs at the boundary surface and/or in the border area between core and casing. Due to this, an optical signal can be guided inside the core.

In addition, the component according to the invention has at least one second waveguide which has a second core. The second core also has a refractive index that differs from the surrounding material. Due to this, an optical signal can also be guided in the second core, said signal being totally reflected on the boundary surface and/or the border area to the surrounding casing.

In one embodiment, the first core and the second core have at least one longitudinal section, in which the two cores are guided side by side and at a distance from each other. A longitudinal section, in which the two cores are guided side by side, is understood to mean for the purposes of the present invention a longitudinal section in which the cores of the waveguides approach each other to such an extent that an evanescent coupling of optical signals from one core to the next core is possible. The longitudinal sections guided side by side do not have to run in a straight line for this purpose. Furthermore, the longitudinal sections do not have to have a constant distance from one another in all embodiments. In some embodiments, one waveguide can be straight and one waveguide can be curved. Therefore, the waveguides do not have to meet the mathematical definition of the term 'parallel' in all embodiments.

In some embodiments of the invention, the distance between the two cores guided side by side can be less than 50 µm, less than 10 µm, less than 1 µm or less than 0.1 µm. As a result, optical signals can pass over from the first core into the second core or from the second core into the first core by evanescent coupling.

In some embodiments of the invention, a mismatch can exist between the first core and the second core. This mismatch prevents or reduces a coupling of optical signals between the cores and can be produced by different refractive index contrasts between core and casing and/or different diameters and/or different cross-sections of the cores. As a result of the mismatch, an optical signal guided in the core cannot couple in an evanescent way into the other core. Furthermore, at least one Bragg grating is disposed in the longitudinal section in which the two cores are guided side by side. As a result of the Bragg grating, light of a predeterminable wavelength or a predeterminable wavelength range can pass over between the first core and the second core irrespective of the mismatch. The wavelength and/or the wavelength range are defined by the grating constant of the Bragg grating.

A mismatch within the meaning of the present invention can mean in some embodiments of the invention that, in the absence of a Bragg grating, the coupling of optical signals is less than 30 dB or less than 20 dB or less than 10 dB.

Furthermore, at least one Bragg grating is arranged in the longitudinal section in which the cores are guided side by side. As a result of the Bragg grating, the evanescently coupled waves are filtered, such that only one wavelength and/or one wavelength range defined by the grating constant of the Bragg grating can couple between the cores.

According to the invention, it is now proposed to arrange at least the first core, the first casing, the second core and the Bragg grating in a single substrate. In contrast to known optical components which use glass fibers as waveguides that are initially embedded in a glass block and are finally in part removed by polishing, the production as an integrated optical component includes fewer method steps which furthermore can be easily automated. In this way, the optical component known per se can be produced in a more cost-effective way and/or can be produced with greater precision and/or the production process can provide a higher yield accompanied by fewer rejects.

In order to produce at least the first core, the first casing, the second core and the Bragg grating on a single substrate, some embodiments of the invention can use a production method which is selected from laser material processing, hot stamping, 3D printing, 2-photon polymerization or lithography. These methods can be carried out with little effort and permit the production of the component according to the invention with little effort, in large numbers and with good reproducibility.

In some embodiments of the invention, laser material processing can be carried out with a short-pulse laser which has a pulse duration of less than 1 ps, less than 100 fs or less than 20 fs. In some embodiments of the invention, the pulse shape and/or the pulse duration can be adapted by matching the amplitude and/or the phase of the laser light emanated from a laser light source with predeterminable desired values. Furthermore, the change in the refractive index in the irradiated regions can be adapted by the number of overwriting operations and/or the selection of the power so as to produce structures with different refractive index contrast. First and second cores and/or Bragg gratings can also be inscribed on top of one another in a thick substrate by changing the focal position of a laser in order to save base area in the substrate in this way.

In addition, the substrate can additionally have optical, electronic or optoelectronic components which can be integrated into the substrate, e.g. by flip-chip bonding or also monolithically. As a result, the production method according to the invention allows the production of highly reliable and still compact components which combine optical and electronic elements.

In some embodiments of the invention, the first casing forms the substrate. This is equivalent to a casing which has a different form with respect to the first core. For example, the first core can have a round cross-section and thus a form which is approximately similar to a circular cylinder. The first casing can be designed as a rectangular platelet into which at least one second core and at least one Bragg grating are inscribed in addition to the first core.

In some embodiments of the invention, the second core can be surrounded by the first casing. For example, a glass fiber or a polymer fiber can be used as the first waveguide. In some embodiments of the invention, this fiber can be a standardized fiber, e.g. from the telecommunications technology. Such fibers are readily available and widely spread. According to the invention, it is now proposed to introduce at least one second core into the casing of the first waveguide e.g. by means of exposure with a laser. As a result, the optical component according to the invention can be provided without requiring additional installation space.

In some embodiments of the invention, the at least one Bragg grating can be arranged in the first core. In other embodiments of the invention, the at least one Bragg grating can be arranged in the second core. In yet other embodiments of the invention, the at least one Bragg grating can be formed in the material of the casing. The intermediate space between the first core and the second core can be used for this purpose in some embodiments. The desired filter function can be realized by the number and/or position of the at least one Bragg grating.

In some embodiments of the invention, a plurality of Bragg gratings can be used to in this manner filter a plurality of wavelengths and/or wavelength ranges when the Bragg gratings have different grating constants. In other embodiments of the invention, a plurality of Bragg gratings of equal grating constant can be used to increase the efficiency of the coupling-out and/or to increase of the contrast of the coupled-out light with respect to the background.

In some embodiments of the invention, a plurality of second cores can be available, each of which is associated with a Bragg grating. In some embodiments of the invention, each of the Bragg gratings can have a different grating constant. In this way, a plurality of narrow-band output signals having different wavelengths and/or different wavelength ranges can be coupled out of a broadband input signal. A component of this type can be used e.g. as a demultiplexer for an optical signal with a plurality of carrier frequencies or as a spectrometer. A spectrometer of this type can be used in some embodiments of the invention as a fiber-integrated signal readout of a fiber-optical sensor system. This allows a particularly simple and mechanically particularly robust detection of temperatures and/or mechanical stresses at mechanical components.

In some embodiments of the invention, a plurality of second cores with respectively associated Bragg gratings can run at a location along the longitudinal extension of the first core. In some embodiments of the invention, the second cores can be arranged for this purpose around the central first core.

In some embodiments, at least one Bragg grating can be made as a chirped Bragg grating. A chirped Bragg grating is understood to mean for the purposes of the present invention a Bragg grating, the grating constant of which varies along the longitudinal extension of the grating. As a result, the width of the reflected wavelength range increases.

In some embodiments of the invention, at least one Bragg grating can be made as an apodized Bragg grating. An apodized Bragg grating is understood to mean for the purposes of the present invention a Bragg grating, the structure of which does not start and end abruptly but follows a Gaussian intensity progression. The Fourier transformation of this form of progression can indicate the spectrum in the frequency space in some embodiments. As a result, the typical shape of the reflection peak, which follows the function $(\sin(x)/x)^2$, is avoided. An apodized grating can have a Gaussian reflection peak instead and thus be better suitable for some applications.

In some embodiments of the invention, the Bragg grating can be made as a pi-shaped Bragg grating. This is understood to mean a combination of two Bragg gratings which act like a Fabry-Pérot interferometer. For this purpose, the two gratings are produced with identical parameters and a phase shift of pi or 180° directly in succession in the first core and/or in the second core. In some embodiments of the invention, this can change the transmission behavior of the Bragg grating. As a result, a transmission peak of reduced spectral width can be created within the comparatively wide reflection range.

The invention shall be explained below by means of embodiments without limiting the general inventive concept, said embodiments being shown in the enclosed drawings, wherein FIG. 1 shows an embodiment of an add-drop filter according to the present invention.

Figure 2:
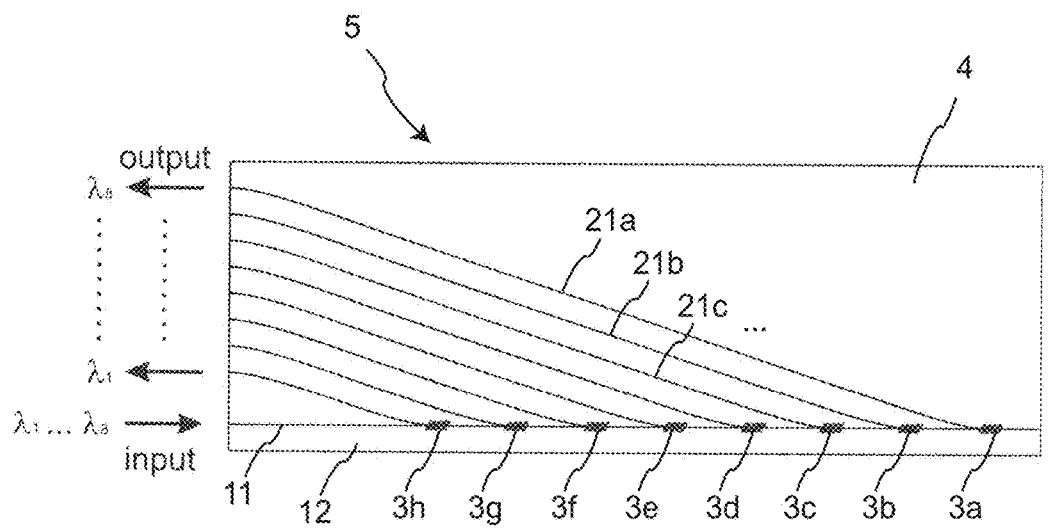
FIG. 2 a spectrometer according to the present invention.

FIG. 2 shows a spectrometer according to the present invention.

Figure 3:
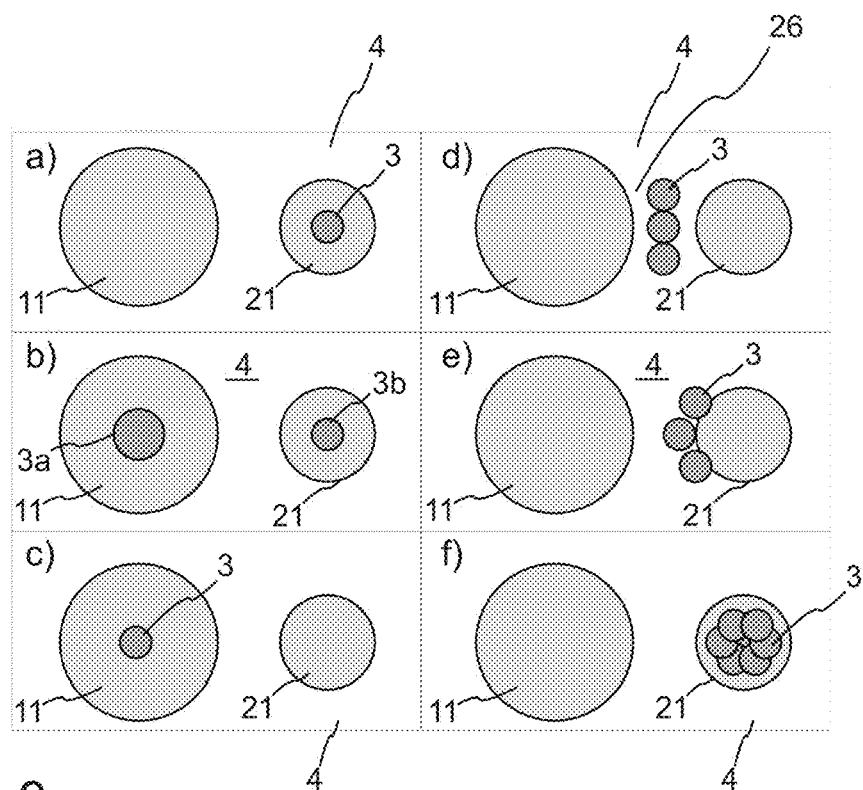
FIG. 3 an explanation of different arrangements of waveguides and Bragg gratings.

FIG. 3 explains different arrangements of waveguides and Bragg gratings.

Figure 4:
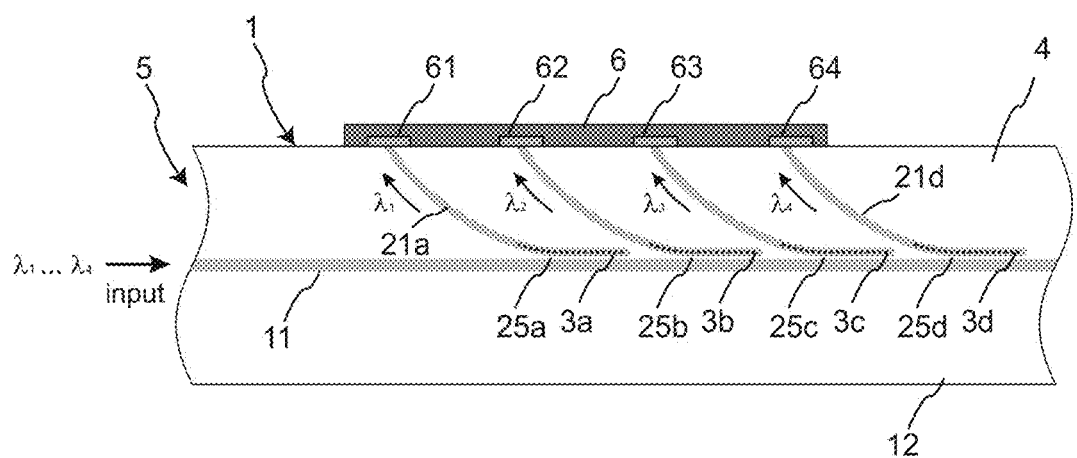
FIG. 4 a waveguide-integrated spectrometer.

FIG. 4 shows a waveguide-integrated spectrometer.

Figure 5:
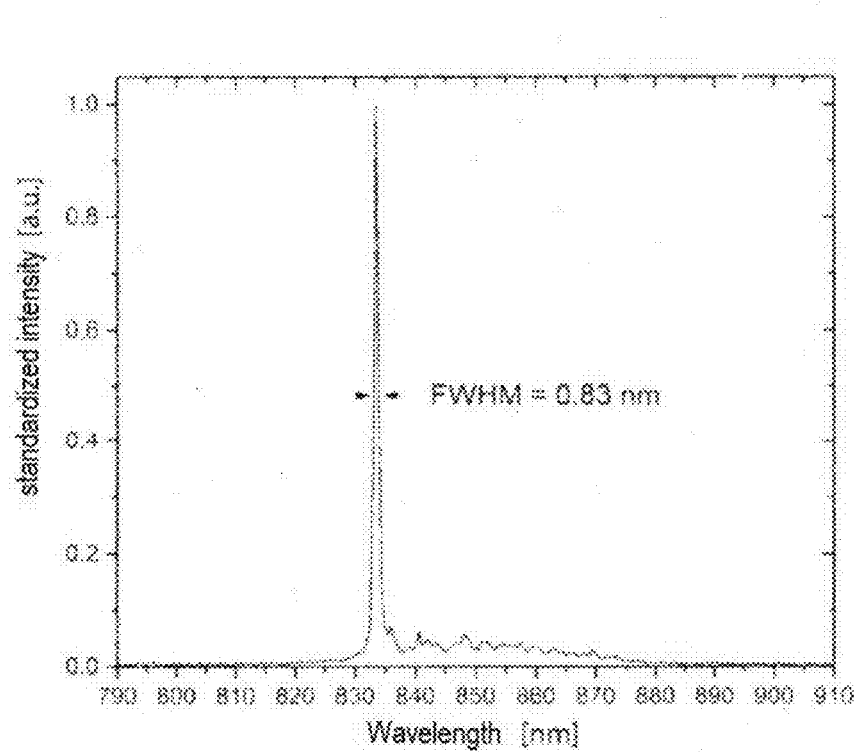
FIG. 5 a transmission behavior of the add-drop filter according to FIG. 1.

FIG. 5 shows the transmission behavior of the add-drop filter according to FIG. 1.

FIG. 1 shows an add-drop filter as first embodiment of the invention. The add-drop filter can be provided with an optical signal which contains a plurality of digital data streams that are coded on respectively associated carrier signals of different wavelength. An optical input signal of this type can also be designated as WDM (wavelength division multiplex) signal.

The object of the add-drop filter is to remove a single data stream with a predeterminable carrier frequency and/or wavelength from the WDM signal and/or to add a carrier signal with a predeterminable wavelength.

For this purpose, the optical component 5 according to the present invention contains a substrate 4, which can consist e.g. of a polymer, glass, quartz or a semiconductor material such as silicon, germanium or a compound semiconductor. In some embodiments of the invention, the substrate 4 can contain a plurality of substrates which integrate a plurality of optical and/or electronic components. For example, the substrate 4 can contain quartz to receive optical components and a silicon substrate can be applied to the quartz substrate 4 by means of flip-chip bonding, adhesion or welding, which receives electronic components.

The substrate 4 has a predeterminable refractive index. The refractive index can be changed in predeterminable regions by processing the material of predeterminable planar or spatial regions of the substrate 4. For this purpose, the substrate 4 can be provided e.g. with dopants and/or can be exposed to electromagnetic radiation. In some embodiments of the invention, the electromagnetic radiation can be provided by a short-pulse laser which has a pulse duration of less than 1 ps or less than 100 fs or less than 20 fs. The refractive index contrast, i.e. the change in the refractive index, can be varied by the laser power, the feed rate, the pulse duration, the pulse shape and the number of overwrite processes and can be adapted to predeterminable desired values.

In the illustrated embodiment, a first core 11 is formed in the substrate 4 by appropriate material processing and is surrounded by a first casing 12. The casing 12 is here formed by the material of the substrate 4. The differences of the refractive index between the core 11 and the casing 12 are here selected in such a way that an optical signal can be guided on the boundary surface in the core 11 by total reflection.

Furthermore, the optical component 5 has a second core 21 which is also formed by a spatial region with different refractive index such that optical signals can also be guided in the second core 21 by total reflection.

Both the first waveguide 1 having the first core 11 and the second waveguide 2 having the second core 21 enter on opposite sides of the approximately rectangular substrate 4, such that the optical component 5 has four terminals which are designated port 1, port 2, port 3 and port 4.

The first core 11 and the second core 21 have a longitudinal section 25, in which they run approximately side by side. In some embodiments of the invention, a mismatch can exist between the first core 11 and the second core 21 which prevents or reduces a coupling of optical signals between the cores. The mismatch can be produced by different refractive index contrasts between core and casing and/or different diameters and/or different cross-sections of the cores 11 and 21. As a result of the mismatch, an optical signal guided in a core cannot couple into the other core in an evanescent way.

In addition, a Bragg grating 3 is arranged in the second core. In some embodiments of the invention, the Bragg grating 3 can be a chirped Bragg grating, an apodized Bragg grating or a phase-shifting and/or pi-shaped Bragg grating. As a result of the Bragg grating, light of a predeterminable wavelength or a predeterminable wavelength range can pass over between the first core 11 and the second core 21 irrespective of the mismatch. The wavelength and/or wavelength range is defined by the grating constant of the Bragg grating.

If a WDM signal is coupled in at port 1, this signal propagates in the first core 11 to port 2. An evanescent coupling of a partial spectrum of the WDM signal into the second core 21 takes place in the longitudinal section 25. Light of a predeterminable wavelength defined by the grating constant of the Bragg grating 3 and/or of a wavelength range is reflected such that it is available at port 4.

Alternatively or additionally, an optical signal with the wavelength defined by the Bragg grating 3 can be coupled in at port 4. An optical signal without this wavelength can be supplied at port 2. The two input signals are then available in combined fashion at port 1. Thus, the optical component 5 according to the first embodiment of the invention, which is shown in FIG. 1, is suitable to remove a certain carrier signal from a WDM signal and provide it at port 4 or to optionally add another data signal which has the same carrier frequency to the WDM signal provided at port 2.

In contrast to known optical components with similar function, the component according to the invention can be provided by laser material processing, hot stamping, printing or similar methods in an easy way with reproducible quality.

In the case of laser material processing, the component 5 can be quickly adapted to different requirements. For example, another sub-signal can be selected from the WDM signal by changing the grating constant of the Bragg grating 3. For this purpose, merely the production data supplied to the laser processing system has to be changed, which is easily possible by means of corresponding computer software. Such a laser material processing also provides a reliable reproducibility of the structures inscribed in the substrate 4, such that no further mechanical processing steps, such as e.g. polishing, grinding or joining, are required. As a result, the production method becomes resistant to errors such that the production yield and the quality can be increased.

FIG. 2 shows a spectrometer as a second embodiment of an optical component 5 according to the present invention. The spectrometer according to the second embodiment also contains a substrate 4, which has a predeterminable refractive index and its refractive index is changed in predeterminable spatial regions. In the case of the second embodiment, this can also be done by exposure of the substrate 4, e.g. by point-to-point exposure with a laser or by masking and subsequent planar exposure.

The optical component 5 according to the second embodiment contains a first core 11, which runs along a longitudinal edge of the substrate 4. The first core 11 is surrounded by the casing 12, which in this case is also formed by the material of the substrate 4. The first core 11 can be produced e.g. by exposure of the material 4 and a hereby induced refractive index change. In other embodiments of the invention, the first core 11 and the casing 12 surrounding this core can also be a glass fiber or a polymer fiber, which is embedded in the material of the substrate 4.

A plurality of Bragg gratings 3 is disposed in or next to the first core 11. The illustrated embodiment shows eight Bragg gratings 3a, 3b, 3c, 3d, 3e, 3f, 3g and 3h. However, the number of Bragg gratings can also be larger or smaller and in some embodiments of the invention it can be e.g. between about 4 and about 20.

A second core 21a, 21b, 21c, 21d, 21e, 21f, 21g and 21h is associated with each Bragg grating. Each second core has a longitudinal section 25, in which the second core 21 runs next to the first core 11, such that an evanescent coupling of optical signals is possible. The Bragg gratings 3 associated with the second cores here act as a filter, such that only light of a predeterminable wavelength determined by the grating constant can pass over into the respective second core 21.

The light guided in the second core 21 is coupled out at the end thereof which can be located e.g. at an edge of the substrate 4. In this way, a number of output waveguides is available that corresponds to the number of second cores 21 and the number of Bragg gratings 3, said waveguides all providing light of a predeterminable wavelength or a predeterminable wavelength range. An optical component 5 according to the second embodiment of the invention can be used as a demultiplexer for a WDM signal in the optical communications technology or as a spectrometer, e.g. for the selection of a fiber-optical sensor system. In some embodiments of the invention, a photodiode array, instead of the output waveguides, can also be present directly at the edge of the substrate 4.

By means of FIG. 3, which shows cross-sections of the first core 11 and of the second core 21 in the region of the longitudinal section 25, the arrangement of at least one Bragg grating 3 is explained in various embodiments of the invention. Here, FIGS. 3a, 3b, 3c, 3d, 3e and 3f all show a first core 11 and a second core 21. In the illustrated embodiments, the cores all have a round cross-section. The second core 21 here has a smaller diameter and a smaller surface area than the first core 11. For example, the first core 11 can be designed as a multi-mode waveguide and the second core 21 as a single mode waveguide. In other embodiments of the invention, the two cores can have an identical cross-section or the first core 11 can have a smaller cross-section than the second core 21. In some embodiments of the invention, the two cores can have a different refractive index contrast with respect to the surrounding material. In some embodiments of the invention, the refractive index contrast of the first core 11 can be larger than the refractive index contrast of the second core 21.

As is clear from FIG. 3, the cores 11 and 21 are arranged at a distance from one another, i.e. the regions associated with the respective cores do not overlap in a direction perpendicular to the direction of expansion. The distance is here selected in such a way that an evanescent coupling is possible. In some embodiments of the invention, the distance can be between about 0.1 and about 5 wavelengths or between about 0.3 and about 3 wavelengths of the signals propagating in the waveguides. In some embodiments of the invention, the distance can be between about 100 nm and about 5 μm or between about 200 nm and about 4 μm or between about 300 nm and about 4 μm or between about 400 nm and about 3 μm or between about 500 nm and about 3 μm.

Different arrangements of the cores and the respectively associated Bragg gratings are shown below:

FIG. 3a shows a second core 21 having a single Bragg grating 3. In this embodiment, the first core 11 does not contain a Bragg grating. The cross-section of FIG. 3a thus corresponds to an embodiment which was already specified by means of FIG. 1.

FIG. 3b shows an embodiment with two Bragg gratings 3a and 3b, each being arranged in the first core 11 and in the second core 21.

According to the embodiment which is shown in FIG. 3c, only the first core 11 contains a Bragg grating 3, whereas the second core 21 was made without a Bragg grating.

FIG. 3d explains an embodiment of the invention, in which three Bragg gratings 3 are used. They are arranged in the substrate 4, namely in the intermediate space 26 between the first core 11 and the second core 21.

FIG. 3e also shows three Bragg gratings 3, which are arranged on the boundary surface of the first core 21 to the surrounding material of the substrate 4. In this case, too, the Bragg gratings 3 face the gap 26 and thus the first core 11.

FIG. 3f shows an embodiment with a plurality of Bragg gratings 3, all of which are arranged in the first core 21. In the illustrated embodiment, six Bragg gratings 3 are available. In other embodiments of the invention, the number of Bragg gratings can be larger or smaller.

Therefore, FIG. 3 explains that the positioning and/or the form of the inscribed Bragg grating 3 can vary within the longitudinal section 25. Depending on the intended use of the optical component 5, the at least one Bragg grating 3 can be arranged inside a waveguide, inside the two waveguides or also between the two waveguides. In some embodiments of the invention, the form of the at least one Bragg grating can be matched with the form of a core of a waveguide.

FIG. 4 shows a third embodiment of the invention. The third embodiment here describes a spectrometer and/or a demultiplexer which is arranged directly in an optical fiber and thus only requires a small additional installation space.

The substrate 4 according to the third embodiment comprises a first waveguide 1, which has a first core 11 and a casing 12 surrounding this core. The waveguide 1 can be a widely spread glass fiber known per se or a polymer fiber. Such fibers are known from optical communications technology. The casing 12 of such a glass fiber can have e.g. a cylindrical base shape, wherein the core 11 with a round cross-section is embedded coaxially in the casing 12. Single-mode or multi-mode fibers can be used. In some embodiments of the invention, the first core can transport a plurality of modes which are coupled out to a plurality of second cores, each of which can only transport a single mode.

The first waveguide 1 is modified by processing it with a laser such that at least one second core 21 is formed in the casing 12 of the first waveguide 1. In the illustrated embodiment, four second cores 21a, 21b, 21c and 21d are shown. In other embodiments of the invention, however, the number of second cores can be larger or smaller. Each second core 21 has an associated longitudinal section 25a, 25b, 25c and 25d, which runs next to the first core 11 in such a way that an evanescent coupling of the optical signal from the first core 11 into the second core 21 is possible.

One associated Bragg grating 3 each is disposed in the longitudinal section 25, as already described above. If the four Bragg gratings 3a, 3b, 3c and 3d have different grating constants, a predeterminable wavelength and/or a predeterminable wavelength range is guided in each second core 21.

The second cores 21 enter at the casing surface of the waveguide 1. This is where a photodiode array 6 can be arranged.

The photodiode array 6 can have a complementary form with respect to the casing surface of the waveguide 1 and partially cover it e.g. in the form of a ring or a half-shell. In the illustrated embodiment, the photodiode array 6 has four photodiodes 61, 62, 63 and 64, each of which receives the light of a second core 21a, 21b, 21c and 21d and converts it into electric signals.

If a WDM signal of a telecommunications system is guided on the first waveguide 1, each photodiode of the photodiode array 6 can receive a data stream of a predeterminable carrier signal defined by the grating constant of the Bragg grating 3a. If the waveguide 1 is part of a fiber-optical sensor system, the third embodiment of the invention, which is shown in FIG. 4, can be used as an integrated spectrometer to evaluate the measurement values of optical sensors without having to accept additional installation space and additional susceptibility to errors by external spectrometers.

FIG. 5 shows the transmission behavior of the add-drop filter according to FIG. 1. The wavelength is shown on the abscissa and the intensity of the light is shown on the ordinate. FIG. 5 shows the optical signal at port 4 of the first embodiment of the invention according to FIG. 1. As shown in FIG. 5, the integrated Bragg grating allows the definition of a small reflection range. As a result, WDM signals can be processed with small channel spacing.

Of course, the invention is not limited to the illustrated embodiments. Therefore, the above description should not be considered limiting but explanatory. The below claims should be understood such that a stated feature is present in at least one embodiment of the invention. This does not rule out the presence of further features. If the claims and the above description define "first" and "second" embodiments, this designation serves to distinguish between two similar embodiments without determining an order.

The invention claimed is:

1. An optical component comprising:
   at least one first waveguide having a first core and a cladding surrounding the first core, the cladding having an outside surface;
   at least one second waveguide having a second core, wherein the first core and the second core are guided side by side and at a distance from one another in a longitudinal section; and
   at least one Bragg grating arranged in the longitudinal section, wherein at least the first core, the cladding, the second core, and the Bragg grating are arranged in a single substrate; and
   a photodiode array arranged on the outside surface of the cladding and coupled to the at least one second waveguide.

2. The optical component according to claim 1, wherein the distance between the first core and the second core in the longitudinal section is between approximately 0.1 and approximately 5 wavelengths of signals propagating in the at least one first waveguide.

3. The optical component according to claim 1, wherein the distance between the first core and the second core in the longitudinal section is
   between approximately 100 nm and approximately 5 µm.

4. The optical component according to claim 1, wherein at least the first core, the second core, and the Bragg grating are obtainable by laser exposure of the substrate.

5. The optical component according to claim 1, wherein at least the second core is surrounded by the cladding or the cladding forms the substrate.

6. The optical component according to claim 1, wherein at least one waveguide is a single-mode waveguide and at least one waveguide is a multi-mode waveguide.

7. The optical component according to claim 1, wherein the Bragg grating is arranged in at least the first core, the second core, or the cladding between the first core and the second core.

8. The optical component according to claim 1, wherein the second core comprises a plurality of second cores, the at least one Bragg grating comprises a plurality of Bragg gratings, and each one of the second cores is associated with a corresponding one of the Bragg gratings.

9. The optical component according to claim 8, wherein each of the Bragg gratings has a different grating constant than the other of the Bragg gratings.

10. The optical component according to claim 1 and further comprising a mismatch between the first core and the second core, wherein the mismatch prevents or reduces a coupling of optical signals between the first core and the second core.

11. The optical component according to claim 10, wherein the mismatch is created by different refractive index contrasts between at least the core and the cladding, different diameters of the cores, or different cross-sections of the cores.

12. The optical component according to claim 1, wherein at least one Bragg grating is designed as a chirped Bragg grating, an apodized Bragg grating, or a pi-shaped Bragg grating.

13. The optical component according to claim 1, wherein the photodiode array has a complementary shape of the outside surface of the cladding of the at least one first waveguide.

14. An optical component comprising:
   at least one first waveguide having a first core and a cladding surrounding the first core, the cladding having an outside surface;
   at least one second waveguide having a second core, wherein the first core and the second core are guided side by side in a longitudinal section; and
   at least one Bragg grating arranged in the longitudinal section, wherein at least the first core, the cladding, the second core and the Bragg grating are arranged in a single substrate,
   wherein a mismatch exists between the first core and the second core, the mismatch preventing or reducing a coupling of optical signals between the cores, and wherein a photodiode array is arranged on the outside surface of the cladding and is coupled to the at least one second waveguide.

15. The optical component according to claim 14, wherein the first core and the second core in the longitudinal section are spaced apart between approximately 0.1 and approximately 5 wavelengths of signals propagating in the at least one first waveguide.

16. The optical component according to claim 14, wherein at least the first core, the second core, and the Bragg grating can be obtained by laser exposure of the substrate.

17. The optical component according to claim 14, wherein at least the second core is surrounded by the cladding or the cladding forms the substrate.

18. The optical component according to claim 14, wherein at least one waveguide is a single-mode waveguide and at least one waveguide is a multi-mode waveguide.

19. The optical component according to claim 14, wherein the Bragg grating is arranged in the first core, the second core, and/or the cladding between the first core and the second core.

20. The optical component according to claim 14, wherein the second core comprises a plurality of second cores, the at least one Bragg grating comprising a plurality of Bragg gratings, wherein each of the second cores is provided with a corresponding one of the Bragg grating.

21. The optical component according to claim 20, wherein each one of the Bragg gratings has a different grating constant than the other of the Bragg gratings.

22. The optical component according to claim 14, wherein the mismatch is produced by different refractive index contrasts between at least the core and the cladding, different diameters of the cores, or different cross-sections of the cores.

23. The optical component according to claim 14, wherein at least one Bragg grating is designed as a chirped Bragg grating, an apodized Bragg grating, or a pi-shaped Bragg grating.

24. The optical component according to claim 1 wherein the optical component is included in a filter or spectrometer.

25. A method for producing an add/drop filter or a spectrometer, comprising:
providing a substrate,
performing a point-to-point exposure of the substrate with a short-pulse laser, such that the refractive index of the substrate changes in exposed areas, wherein at least one second core and at least one Bragg grating and a first core are inscribed in the substrate in such a way that the first core and the at least one second core run side by side and adjacent to one another in a longitudinal section;
disposing at least one Bragg grating in the longitudinal section; and
arranging a photodiode array on the substrate, the photodiode array coupled to at least one waveguide and configured to receive an optical signal from the second core.

26. The method according to claim 25, wherein the substrate comprises a first waveguide having the first core, a cladding that surrounds the first core, and the at least one second core and the at least one Bragg grating inscribed in the cladding.

27. The method according to claim 25, further comprising varying a number of single pulses so as to influence a spot, a pulse shape, a pulse energy, a feed rate, or a number of overwrite processes.

* * * * *